US009728093B2

(12) United States Patent
Wiesemann et al.

(10) Patent No.: US 9,728,093 B2
(45) Date of Patent: *Aug. 8, 2017

(54) METHODS AND SYSTEMS FOR DYNAMICALLY PROVIDING CONTEXTUAL WEATHER INFORMATION

(71) Applicant: The Boeing Company, Chicago, IL (US)

(72) Inventors: Thorsten Wiesemann, Frankfurt (DE); Theo Hankers, Braunschweig (DE); Cindy Dorfmann, Baden-Wuerttemberg (DE); Andreas Sindlinger, Weinheim (DE)

(73) Assignee: The Boeing Company, Chicago, IL (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/132,567

(22) Filed: Apr. 19, 2016

(65) Prior Publication Data

US 2016/0232797 A1    Aug. 11, 2016

Related U.S. Application Data

(63) Continuation of application No. 13/046,443, filed on Mar. 11, 2011, now Pat. No. 9,349,296.

(51) Int. Cl.
*G01C 21/34* (2006.01)
*G08G 5/00* (2006.01)
(Continued)

(52) U.S. Cl.
CPC .......... *G08G 5/0091* (2013.01); *G01C 23/00* (2013.01); *G08G 5/003* (2013.01); *G08G 5/0013* (2013.01); *G08G 5/0021* (2013.01); *G08G 5/0047* (2013.01); *G05D 1/0202* (2013.01); *G06F 3/04817* (2013.01); *G06F 3/04845* (2013.01); *G08G 5/0039* (2013.01)

(58) Field of Classification Search
CPC .... G08G 5/0021; G08G 5/003; G08G 5/0091; G08G 5/0013; G08G 5/0039; G08G 5/0047; G05D 1/0202; G05D 1/0206; G05D 1/021; G01C 23/00; G01C 21/26; G06F 3/04817; G06F 3/04845
USPC ...... 701/3, 4, 9, 10, 14, 120, 400, 409, 410, 701/415, 423, 439
See application file for complete search history.

(56) References Cited

U.S. PATENT DOCUMENTS

| 4,521,857 A | 6/1985 | Reynolds, III |
| 5,265,024 A | 11/1993 | Crabill et al. |

(Continued)

FOREIGN PATENT DOCUMENTS

| EP | 2320406 A1 | 5/2011 |
| WO | 2008091574 A1 | 7/2008 |

OTHER PUBLICATIONS

GB Combined Search and Examination Report for related application GB1204421.0 dated Mar. 11, 2103; 11 pp.
(Continued)

*Primary Examiner* — Chuong P Nguyen
(74) *Attorney, Agent, or Firm* — Armstrong Teasdale LLP (57) ABSTRACT

Methods and systems are provided for presenting contextual weather information with respect to a predetermined route of a vehicle. Routing data for a vehicle is integrated with weather data for an area to generate contextual weather information.

20 Claims, 4 Drawing Sheets

(51) Int. Cl.
*G01C 23/00* (2006.01)
*G05D 1/02* (2006.01)
*G06F 3/0481* (2013.01)
*G06F 3/0484* (2013.01)

(56) References Cited

U.S. PATENT DOCUMENTS

| | | | |
|---|---|---|---|
| 6,199,008 B1 * | 3/2001 | Aratow | G01C 23/00 |
| | | | 701/120 |
| 6,289,277 B1 | 9/2001 | Feyereisen et al. | |
| 6,356,839 B1 | 3/2002 | Monde et al. | |
| 6,381,538 B1 | 4/2002 | Robinson et al. | |
| 6,603,405 B2 | 8/2003 | Smith | |
| 6,700,482 B2 | 3/2004 | Ververs et al. | |
| 6,828,922 B1 | 12/2004 | Gremmert et al. | |
| 6,917,297 B2 | 7/2005 | Andrews et al. | |
| 6,917,860 B1 | 7/2005 | Robinson et al. | |
| 7,027,898 B1 | 4/2006 | Leger et al. | |
| 7,379,816 B2 | 5/2008 | Southard et al. | |
| 7,471,995 B1 * | 12/2008 | Robinson | G01C 23/00 |
| | | | 340/901 |
| 7,612,688 B1 | 11/2009 | Vigeant-Langlois et al. | |
| 7,664,601 B2 | 2/2010 | Daly et al. | |
| 7,667,621 B2 | 2/2010 | Dias et al. | |
| 7,702,427 B1 | 4/2010 | Sridhar et al. | |
| 7,734,411 B2 * | 6/2010 | Gremmert | G05D 1/0607 |
| | | | 701/4 |
| 7,783,393 B2 * | 8/2010 | Tucker | G01C 23/00 |
| | | | 340/945 |
| 7,835,855 B2 | 11/2010 | Nomura | |
| 8,106,794 B2 | 1/2012 | Pinheiro | |
| 8,180,502 B2 | 5/2012 | Satoh | |
| 8,190,359 B2 | 5/2012 | Bourne | |
| 8,217,828 B2 | 7/2012 | Kirk | |
| 8,471,727 B2 | 6/2013 | Batsakes et al. | |
| 8,626,428 B2 | 1/2014 | Ramaiah et al. | |
| 2002/0039072 A1 | 4/2002 | Gremmert et al. | |
| 2004/0044445 A1 | 3/2004 | Burdon | |
| 2006/0287818 A1 | 12/2006 | Okude et al. | |
| 2008/0021648 A1 | 1/2008 | Wilson | |
| 2008/0133125 A1 * | 6/2008 | Nomura | G01C 21/3694 |
| | | | 701/423 |
| 2008/0180282 A1 | 7/2008 | Brosius et al. | |
| 2008/0183346 A1 | 7/2008 | Brown | |
| 2008/0255714 A1 | 10/2008 | Ross | |
| 2009/0109065 A1 | 4/2009 | Pinheiro | |
| 2010/0057275 A1 | 3/2010 | Schilke et al. | |
| 2010/0332056 A1 * | 12/2010 | Kirk | G01W 1/04 |
| | | | 701/14 |
| 2012/0147030 A1 | 6/2012 | Hankers et al. | |

OTHER PUBLICATIONS

GB Examination Report for related application GB1204421.0 dated Sep. 19, 2013; 5 pp.

* cited by examiner

METHODS AND SYSTEMS FOR DYNAMICALLY PROVIDING CONTEXTUAL WEATHER INFORMATION

CROSS REFERENCE TO RELATED APPLICATIONS

This application is a continuation of U.S. patent application Ser. No. 13/046,443, filed Mar. 11, 2011 the disclosure of which is hereby incorporated herein by reference in their entirety.

A portion of this disclosure contains material which is subject to copyright protection. The copyright owner has no objection to the reproduction of the patent document as it appears in the U.S. Patent and Trademark Office patent file or records, but otherwise reserves all copyrights.

BACKGROUND

The present disclosure relates generally to surveillance and/or navigation systems and, more particularly, to methods and systems for dynamically providing weather information to a user to enable the user to associate the weather information with a flight plan.

Information is commonly provided to a pilot through flight logs/bags, manuals, paper charts, cockpit displays, and/or other communication systems. Typically, the pilot filters out non-applicable information and processes information applicable to a task at hand. For example, the pilot may consider information on the cockpit display in view of weather conditions to calculate a lateral flight path, a vertical flight path, and/or a velocity for the aircraft.

Dynamic information is generally more difficult to process than static information. Weather information, for example, is typically provided in a briefing prior to a flight via an automated message that includes limited information. Moreover, current weather information is provided during flight through onboard sensors. As such, weather information provided during flight generally does not provide any forecasting and/or historical information.

BRIEF DESCRIPTION

In one aspect, a method of presenting contextual weather information with respect to a predetermined route of a vehicle is provided. The method includes receiving routing data for the vehicle, receiving weather data for an area, automatically integrating the routing data with the weather data to generate contextual weather information, presenting the contextual weather information with respect to a predetermined route of the vehicle, and presenting a route timeline with respect to a predetermined route of the vehicle. The route timeline includes a first time indicator representative of a first time. The vehicle is at a first position associated with a first time and a ghost time indicator representative of a second time. The ghost time indicator is movable along the route timeline to represent a relative time with respect to the first time. The method also includes presenting a timer indicating a time associated with the ghost time indicator as the ghost time indicator moves along the route timeline and displaying a first icon of the vehicle at the first position associated with the first time while simultaneously displaying a ghost icon of the vehicle at a second position associated with the second time in response to a user input that moves the ghost time indicator along the presented route timeline to the second time. The first time indicator is different from the first icon and the ghost time indicator is different from the ghost icon.

In another aspect, a server is provided for presenting contextual weather information with respect to a predetermined route of a vehicle. The server includes a memory device and a processor coupled to the memory device. The server is programmed to receive routing data for the vehicle, receive weather data for an area, integrate the routing data with the weather data to generate contextual weather information, present the contextual weather information with respect to a predetermined route of the vehicle, and present a route timeline with respect to a predetermined route of the vehicle. The route timeline includes a first time indicator representative of a first time. The vehicle is at a first position associated with a first time and a ghost time indicator representative of a second time. The ghost time indicator is movable along the route timeline to represent a relative time with respect to the first time. The server is also programmed to present a timer indicating a time associated with the ghost time indicator as the ghost time indicator moves along the route timeline and display a first icon of the vehicle at the first position associated with the first time while simultaneously displaying a ghost icon of the vehicle at a second position associated with the second time in response to a user input that moves the ghost time indicator along the presented route timeline to the second time. The first time indicator is different from the first icon and the ghost time indicator is different from the ghost icon.

In yet another aspect, a system is provided for presenting contextual weather information with respect to a predetermined route of a vehicle. The system includes a sensor configured to detect an atmospheric condition and a server including a memory device and a processor coupled to the memory device. The server is programmed to receive routing data for the vehicle, receive weather data for an area, the weather data including the atmospheric condition detected by the sensor, integrate the routing data with the weather data to generate contextual weather information, present the contextual weather information with respect to a predetermined route of the vehicle, and present a route timeline with respect to a predetermined route of the vehicle. The route timeline includes a first time indicator representative of a first time. The vehicle is at a first position associated with a first time and a ghost time indicator representative of a second time. The ghost time indicator is movable along the route timeline to represent a relative time with respect to the first time. The server is also programmed to present a timer indicating a time associated with the ghost time indicator as the ghost time indicator moves along the route timeline and display a first icon of the vehicle at the first position associated with the first time while simultaneously displaying a ghost icon of the vehicle at a second position associated with the second time in response to a user input that moves the ghost time indicator along the presented route timeline to the second time. The first time indicator is different from the first icon and the ghost time indicator is different from the ghost icon.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of a drawing may be referenced and/or claimed in combination with any feature of any other drawing.

DETAILED DESCRIPTION

The present disclosure relates generally to surveillance and/or navigation systems and, more particularly, to methods and systems for use in providing dynamic information to a user. In one embodiment, an interactive cockpit display presents contextual weather information with respect to a predetermined flight of an aircraft. The contextual weather information is an integration of at least flight plan information and a weather forecast. Accordingly, the interactive cockpit display enables a user to quickly understand and process flight plans, weather forecasts, and/or other dynamic information.

An exemplary technical effect of the methods and systems described herein includes at least one of: (a) receiving routing data for a vehicle; (b) receiving weather data for an area; (c) integrating the routing data with the weather data to generate contextual weather information; and (d) presenting at least the contextual weather information with respect to a predetermined route of the vehicle.

While the following description references an aircraft, it should be appreciated that the subject matter described herein may be applicable to the surveillance, navigation, and/or operation of any type of vehicle. For example, the subject matter described herein could be just as readily applied to the surveillance, navigation, and/or operation of a marine vessel, a land vehicle, and/or any other vehicle in which the operator may be required to cognitively process dynamic information before or while performing an operational procedure. Accordingly, any reference to "aircraft" throughout the following description is merely meant to illustrate one potential application of the teachings of the subject matter described herein.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
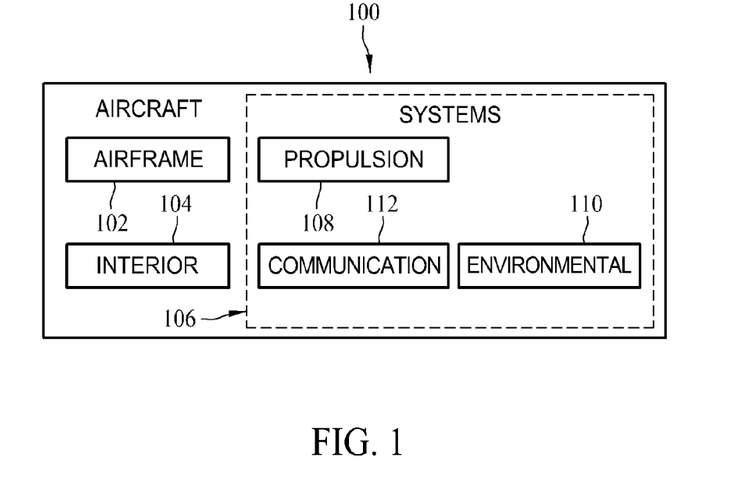
FIG. 1 is a schematic illustration of an exemplary aircraft including a plurality of components.

FIG. 1 illustrates an exemplary aircraft 100. In the exemplary embodiment, aircraft 100 includes an airframe 102, an interior 104, and a plurality of operational systems 106. More specifically, in the exemplary embodiment, operational systems 106 include a propulsion system 108 for use in maneuvering aircraft 100, an environmental system 110 for use in detecting an environmental condition, and/or a communication system 112 for use in receiving data and/or information from a remote location (not shown). Aircraft 100 may include any number of other systems that enables aircraft 100 to function as described herein.

Figure 2:
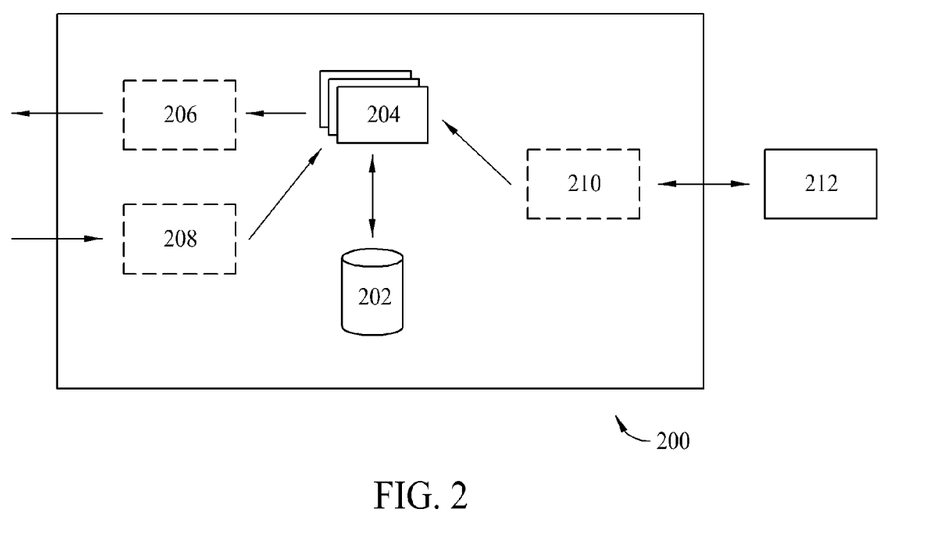
FIG. 2 is a schematic illustration of an exemplary computing system that may be used to provide dynamic information to the aircraft shown in FIG. 1.

FIG. 2 illustrates an exemplary computing system and/or server 200 that may be used to provide dynamic information to aircraft 100. In the exemplary embodiment, server 200 includes a memory device 202 and a processor 204 coupled to memory device 202 for use in executing instructions. In the exemplary embodiment, server 200 is configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 202 includes one or more devices (not shown) that enable information such as executable instructions and/or other data to be selectively stored and retrieved. In the exemplary embodiment, such data may include, but is not limited to, operational data, flight plan data, geographical data, weather forecasts, and/or atmospheric conditions. Memory device 202 may also include one or more computer readable media, such as, without limitation, dynamic random access memory (DRAM), static random access memory (SRAM), a solid state disk, and/or a hard disk.

In the exemplary embodiment, server 200 includes a presentation interface 206 that is coupled to processor 204 for use in presenting information to a user. For example, presentation interface 206 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 206 includes one or more display devices.

Server 200, in the exemplary embodiment, includes an input interface 208 for receiving input from the user. For example, in the exemplary embodiment, input interface 208 receives information suitable for use with the methods described herein. Input interface 208 is coupled to processor 204 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 206 and as input interface 208.

In the exemplary embodiment, server 200 includes a communication interface 210 that is coupled to processor 204. In the exemplary embodiment, communication interface 210 communicates with a remote device (not shown). For example, communication interface 210 may use, without limitation, a wired network adapter, a wireless network adapter, and/or a mobile telecommunications adapter. A network (not shown) used to couple server 200 to the remote device may include, without limitation, the Internet, a local area network (LAN), a wide area network (WAN), a wireless LAN (WLAN), a mesh network, and/or a virtual private network (VPN) or other suitable communication means.

In the exemplary embodiment, server 200 is coupled to a sensor 212 via communication interface 210. In the exemplary embodiment, sensor 212 is configured to detect at least one atmospheric condition including, a temperature, a precipitation, a humidity, a pressure, a particle count, and/or a wind speed. As used herein, the term "atmospheric condition" refers to a physical property whose value can be used to define an environmental condition at a predefined location.

Figure 3:
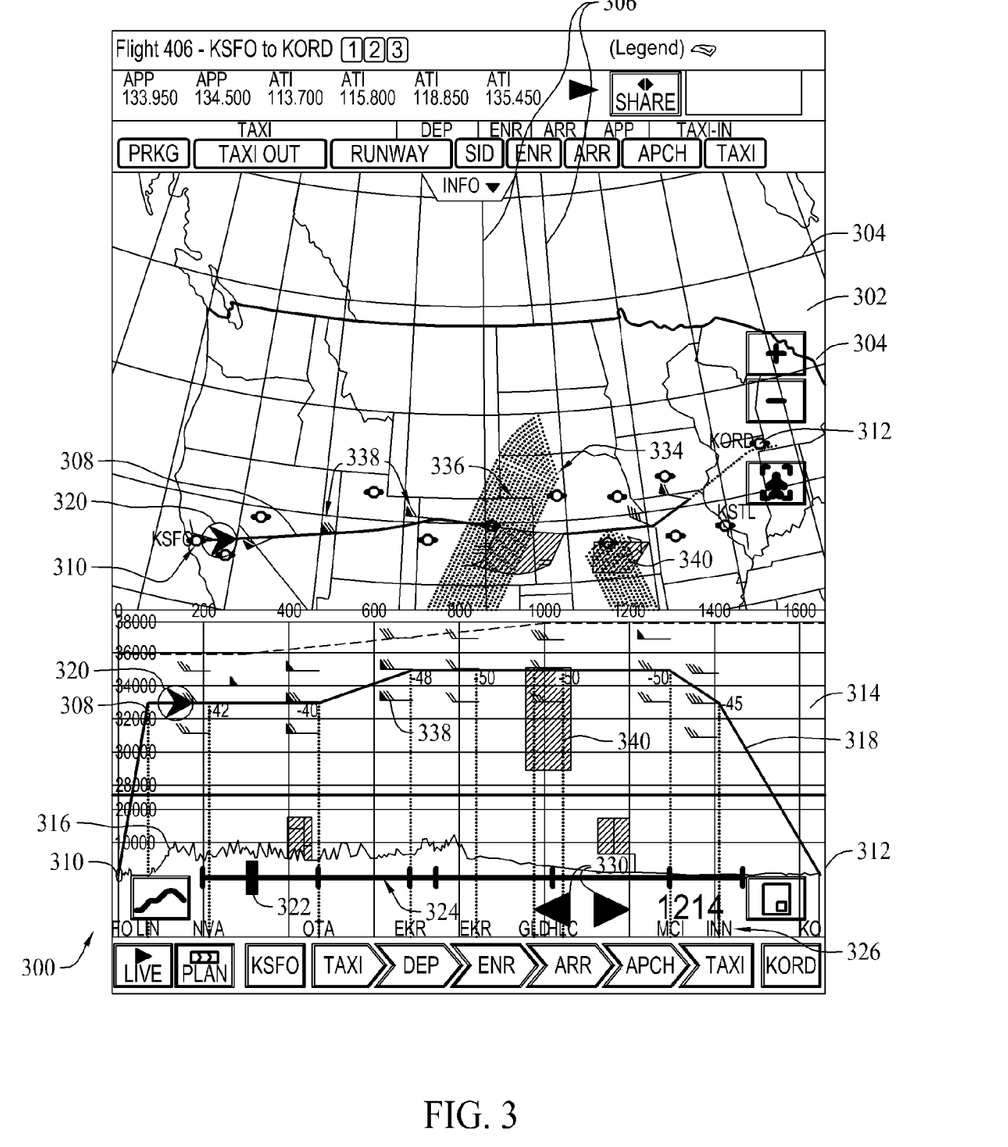
FIGS. 3-5 are exemplary screenshots that may be presented to a user using the system shown in FIG. 2.
Figure 4:
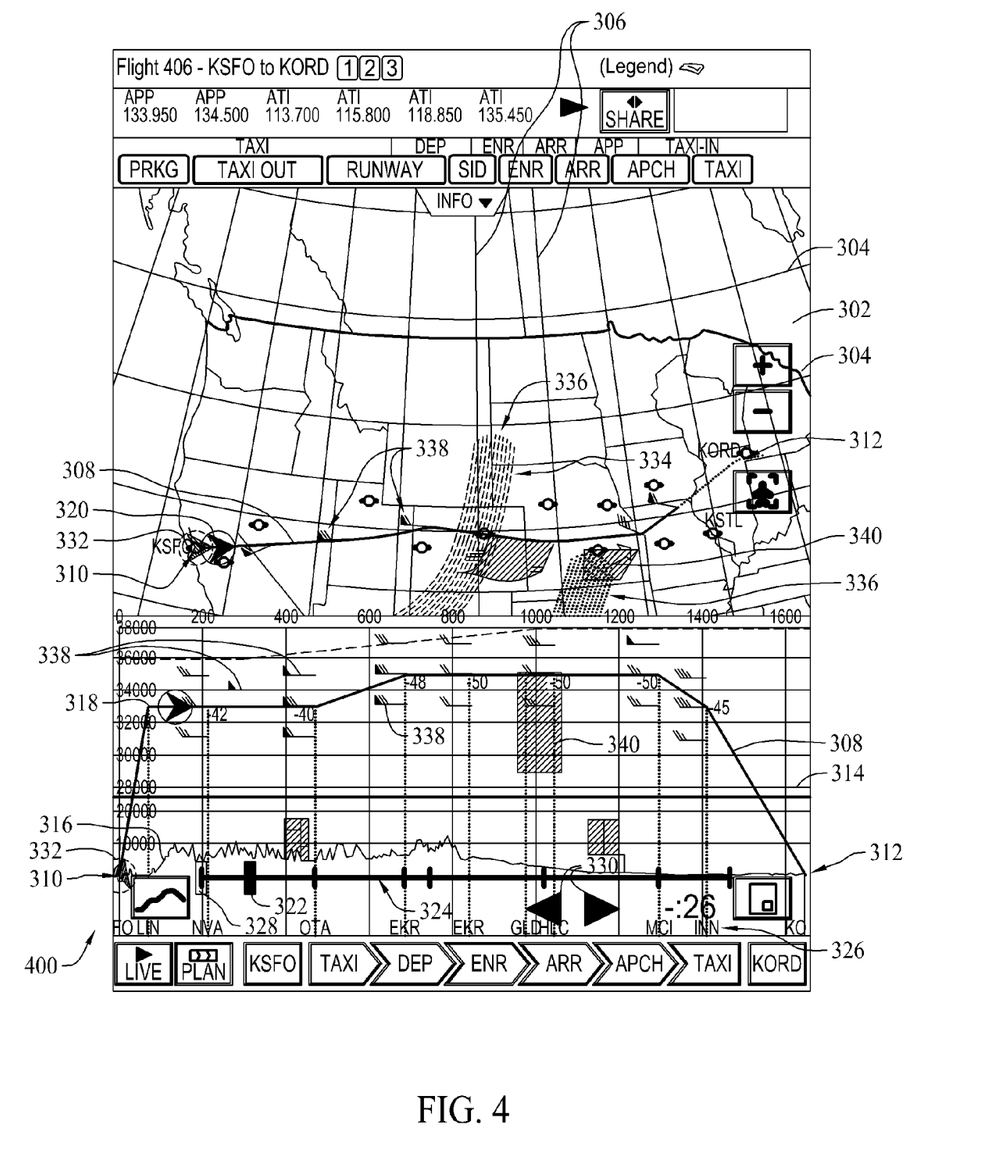
Figure 5:
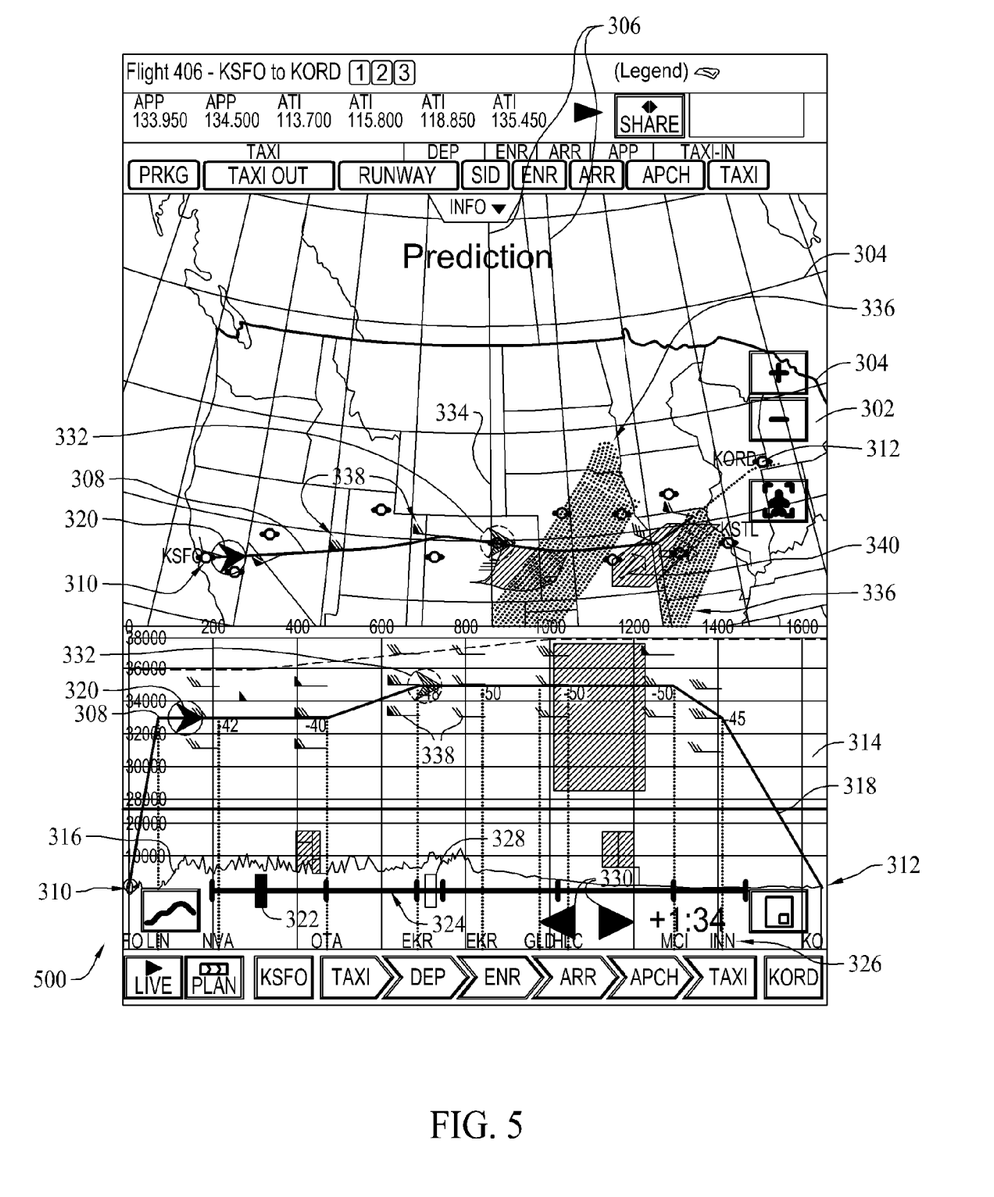

FIGS. 3-5 are exemplary screenshots 300, 400, and 500 that may be presented on presentation interface 206. FIG. 3 shows present time screenshot 300, FIG. 4 shows past time screenshot 400, and FIG. 5 shows future time screenshot 500, described in more detail below. Presentation interface 206 may include a display panel that is positioned in, for example, an aircraft cockpit for viewing by a pilot and/or a control tower for viewing by an air traffic controller. In the exemplary embodiment, presentation interface 206 presents a selectively movable first map 302 that represents an area of the world being traversed by aircraft 100. In the exemplary embodiment, first map 302 is a two-dimensional representation of the area. For example, in the exemplary embodiment, first map 302 includes latitudinal lines 304 and/or longitudinal lines 306 to provide a point of reference.

In the exemplary embodiment, routing data is used to illustrate a flight plan 308 for aircraft 100. In the exemplary embodiment, flight plan 308 represents a predetermined route between a departure point 310 and an arrival point 312. For example, in the exemplary embodiment, a user may determine from flight plan 308 that aircraft 100 is routed to fly from San Francisco (KSFO) to Chicago (KORD). Moreover, as shown in FIGS. 3 and 4, presentation interface 206 presents a selectively movable second map 314 that represents the area of the world being traversed by aircraft 100 from a perspective that is different than the perspective of first map 302. For example, in the exemplary embodiment, second map 314 is a profile or an elevation view that illustrates a ground elevation 316, an aircraft altitude 318, and/or weather data, described in more detail below, with respect to a duration of flight plan 308. Maps 302 and 314 may show any area of the world from any perspective that enables a user to function aircraft 100 as described herein.

In the exemplary embodiment, a first icon 320 is positioned on first map 302 and/or second map 314 along flight plan 308 to indicate a current position of aircraft 100. As shown in FIG. 3, for example, a user may determine from flight plan 308 and first icon 320 that aircraft 100 has taken off from San Francisco (KSFO) and has reached a first cruising altitude in California. In the exemplary embodiment, presentation interface 206 presents a first time indicator 322 along a timeline 324 that is representative of a current time with respect to the direction of flight plan 308. As shown in FIG. 3, a timer 326 provides the current time in a numerical format (e.g., 12:14). In one embodiment, current information includes information about each element based on a last valid report and/or observation. That is, in such an embodiment, the last valid report and/or observation may be shown with an opacity associated with a relevance of the information such as, without limitation, an amount of time that has passed since the last valid report and/or observation. For example, older information may be presented with a reduced opacity, and newer information may be presented with an increased opacity.

Moreover, as shown in FIGS. 4 and 5, a second time indicator 328 is movable along timeline 324 to represent a relative time, with respect to the current time. Additionally or alternatively, backward and forward buttons 330 may be used to selectively move second time indicator 328 backwards and forwards, respectively, along timeline 324. For example, in FIG. 4, second time indicator 328 is positioned to the left of first time indicator 322 and is, thus, representative of a past time. In the exemplary embodiment, timer 326 indicates that the past time is approximately twenty-six minutes ago. In the exemplary embodiment, a second icon 332 is positioned on first map 302 and/or second map 314 along flight plan 308 to indicate a past position of aircraft 100 relative to the current position of aircraft 100. For example, based on screenshot 400, a user may determine from second icon 332 and timer 326 that aircraft 100 was located in San Francisco (KSFO) approximately twenty-six minutes ago. In the exemplary embodiment, second icon 332 is a "ghost ship" with a reduced opacity. That is, in the exemplary embodiment, first icon 320 is a solid white representation of aircraft 100, and second icon 332 is a greyed representation of aircraft 100 and/or has a dashed line about a perimeter of second icon 332. Alternatively, second icon 332 is visually distinguishable from first icon 320 using any representation means that enables presentation interface 206 to function as described herein.

In FIG. 5, second time indicator 328 is positioned to the right of first time indicator 322 and is, thus, representative of a future time. In the exemplary embodiment, timer 326 indicates the future time is approximately one hour and thirty-four minutes in the future. In the exemplary embodiment, second icon 332 is positioned on first map 302 and/or second map 314 along flight plan 308 to indicate a future position of aircraft 100 relative to the current position of aircraft 100. For example, based on screenshot 500, a user may determine from second icon 332 and timer 326 that aircraft 100 is forecasted and/or estimated to be located near Denver (KDEN) in approximately one hour and thirty-four minutes. In one embodiment, presentation interface 206 presents the term "PREDICTION" to facilitate advising a user that forecasted information is being shown on presentation interface 206. Additionally or alternatively, in one embodiment, presentation interface 206 reverts back to current time screenshot 300 after a predetermined amount of idle time passes to ensure that a user is viewing current information.

In the exemplary embodiment, routing data or, more specifically, flight plan 308 is integrated with weather data or, more specifically, at least one weather indicator 334 for the area of the world being traversed. Weather indicators 334 may be representative of weather and/or atmospheric conditions including, without limitation, precipitation 336 and/or winds and temperatures aloft 338 such as jet streams. In the exemplary embodiment, contextual weather information is presented to a user to facilitate increasing an efficiency of aircraft 100 and/or flight plan 308. For example, in the exemplary embodiment, flight plan 308 is adjustable to reroute aircraft 100 to fly around inclement weather and/or against a headwind. Additionally or alternatively, flight plan 308 may be adjustable to reroute aircraft 100 to fly through clement weather and/or with a tailwind. In one embodiment, server 200 automatically adjusts flight plan 308 based on at least one weather indicator 334. Moreover, in such an embodiment, weather data and/or flight data are dynamically updated based on a change to flight plan 308. In the exemplary embodiment, presentation interface 206 presents applicable weather information. For example, in the exemplary embodiment, wind information is presented for predetermined waypoints and/or in fixed intervals along flight plan 308. In one embodiment, server 200 automatically determines whether weather data is applicable and, if so, displays an associated weather indicator 334. Additional information may be selectively presented with various zoom levels and/or in a separate profile window.

Moreover, in the exemplary embodiment, weather indicators 334 are dynamic and are configured to change based on and/or timer 326 and/or a position of second time indicator 328. That is, as a user selectively moves second time indicator 328 along timeline 324, second icon 332 represents a past or future position of aircraft 100 and weather indicators 334 represent past or future weather conditions for the time associated with second time indicator 328 and/or timer 326. For example, FIG. 3 shows current weather conditions for the area of the world being traversed by aircraft 100, FIG. 4 shows weather conditions for twenty-six minutes before the current time, and FIG. 5 shows weather conditions for one hour and third-four minutes from the current time.

Moreover, in the exemplary embodiment, presentation interface 206 presents a NOTAM ("notice to airmen"), a SIGMET ("significant meteorological information"), and/or notice 340 that may affect aircraft 100 and/or flight plan 308. Notice 340 may indicate, for example, a flight-restricted area. Additionally, notice 240 may enable a user to estimate size, intensity, and/or movement of a weather area. In the exemplary embodiment, flight plan 308 is adjustable to reroute aircraft 100 to fly around notice 340. In one embodiment, server 200 automatically adjusts flight plan 308 based on at least one notice 340. In the exemplary embodiment, notice 340 is dynamic and is configured to change based on timer 326 and/or a position of second time indicator 328. That is, as a user selectively moves second time indicator 328 along timeline 324, second icon 332 represents a past or future position of aircraft 100 and notices 340 represent past or future notices for the time associated with second time indicator 328 and/or timer 326. For example, FIG. 3 shows current notices for the area of the world being traversed by aircraft 100, FIG. 4 shows notices for twenty-six minutes before the current time, and FIG. 5 shows notices for one hour and third-four minutes from the current time. Additionally or alternatively, an off-screen indicator may be used to show applicable weather information 334 and/or notice 340.

The above-described surveillance and/or navigation system provides situational awareness information for use by a flight crew and/or a control tower operator. That is, the above-described surveillance and/or navigation system enables efficient decision-making based on dynamic, real-time, contextual weather information. As such, the systems and methods described herein facilitate reducing a cognitive workload of the flight crew and/or the control tower operator.

Exemplary embodiments of systems and methods for providing dynamic information are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of presenting contextual weather information with respect to a predetermined route of a vehicle, said method comprising:
   receiving routing data for the vehicle;
   receiving weather data for an area;
   automatically integrating the routing data with the weather data to generate contextual weather information;
   presenting the contextual weather information with respect to a predetermined route of the vehicle;
   presenting a route timeline with respect to a predetermined route of the vehicle, wherein the route timeline includes a first time indicator representative of a first time, wherein the vehicle is at a first position associated with a first time and a ghost time indicator representative of a second time, and wherein the ghost time indicator is movable along the route timeline to represent a relative time with respect to the first time;
   presenting a timer indicating a time associated with the ghost time indicator as the ghost time indicator moves along the route timeline; and
   displaying a first icon of the vehicle at the first position associated with the first time while simultaneously displaying a ghost icon of the vehicle at a second position associated with the second time in response to a user input that moves the ghost time indicator along the presented route timeline to the second time, wherein the first time indicator is different from the first icon and the ghost time indicator is different from the ghost icon.

2. A method in accordance with claim 1, further comprising automatically adjusting the predetermined route to avoid at least one weather condition.

3. A method in accordance with claim 1, further comprising presenting the second position of the vehicle to be visually distinguishable from the first position of the vehicle.

4. A method in accordance with claim 1, wherein automatically integrating the routing data with the weather data further comprises associating a predetermined time with the first position of the vehicle and at least one weather condition of the area.

5. A method in accordance with claim 1, wherein automatically integrating the routing data with the weather data further comprises associating a predetermined time with the first position of the vehicle and at least one notice for a predetermined location.

6. A method in accordance with claim 5, wherein presenting the contextual weather information further comprises presenting the first position of the vehicle with respect to the at least one notice for the predetermined location.

7. A method in accordance with claim 1, wherein receiving routing data further comprises updating at least one of the routing data for the vehicle and the weather data for the area on a continuous basis.

8. A method in accordance with claim 1, further comprising:
presenting a predetermined route of the vehicle based on the routing data, including a first icon of the vehicle at a first position associated with a first time; and
displaying the first icon and the ghost icon on the presented predetermined route.

9. A server for presenting contextual weather information with respect to a predetermined route of a vehicle, said server comprising a memory device and a processor coupled to the memory device, said server programmed to:
receive routing data for the vehicle;
receive weather data for an area;
integrate the routing data with the weather data to generate contextual weather information;
present the contextual weather information with respect to a predetermined route of the vehicle;
present a route timeline with respect to a predetermined route of the vehicle, wherein the route timeline includes a first time indicator representative of a first time, wherein the vehicle is at a first position associated with a first time and a ghost time indicator representative of a second time, and wherein the ghost time indicator is movable along the route timeline to represent a relative time with respect to the first time;
present a timer indicating a time associated with the ghost time indicator as the ghost time indicator moves along the route timeline; and
display a first icon of the vehicle at the first position associated with the first time while simultaneously displaying a ghost icon of the vehicle at a second position associated with the second time in response to a user input that moves the ghost time indicator along the presented route timeline to the second time, wherein the first time indicator is different from the first icon and the ghost time indicator is different from the ghost icon.

10. A server in accordance with claim 9, wherein said server is further programmed to automatically adjust the predetermined route to avoid at least one weather condition.

11. A server in accordance with claim 9, wherein said server is further programmed to present the second position of the vehicle to be visually distinguishable from the first position of the vehicle.

12. A server in accordance with claim 9, wherein said server is further programmed to associate a predetermined time with the first position of the vehicle and at least one weather condition of the area.

13. A server in accordance with claim 9, wherein said server is further programmed to associate a predetermined time with the first position of the vehicle and at least one notice for a predetermined location.

14. A server in accordance with claim 9, wherein said server is further programmed to present the first position of the vehicle with respect to at least one of a weather condition and a notice.

15. A system for presenting contextual weather information with respect to a predetermined route of a vehicle, said system comprising:
a sensor configured to detect an atmospheric condition; and
a server comprising a memory device and a processor coupled to the memory device, said server programmed to:
receive routing data for the vehicle;
receive weather data for an area, the weather data including the atmospheric condition detected by the sensor;
integrate the routing data with the weather data to generate contextual weather information;
present the contextual weather information with respect to a predetermined route of the vehicle;
present a route timeline with respect to a predetermined route of the vehicle, wherein the route timeline includes a first time indicator representative of a first time, wherein the vehicle is at a first position associated with a first time and a ghost time indicator representative of a second time, and wherein the ghost time indicator is movable along the route timeline to represent a relative time with respect to the first time;
present a timer indicating a time associated with the ghost time indicator as the ghost time indicator moves along the route timeline; and
display a first icon of the vehicle at the first position associated with the first time while simultaneously displaying a ghost icon of the vehicle at a second position associated with the second time in response to a user input that moves the ghost time indicator along the presented route timeline to the second time, wherein the first time indicator is different from the first icon and the ghost time indicator is different from the ghost icon.

16. A system in accordance with claim 15, wherein said server is further programmed to automatically adjust the predetermined route to avoid at least one weather condition.

17. A system in accordance with claim 15, wherein said server is further programmed to present the second position of the vehicle to be visually distinguishable from the first position of the vehicle.

18. A system in accordance with claim 15, wherein said server is further programmed to associate a predetermined time with the first position of the vehicle and at least one weather condition of the area.

19. A system in accordance with claim 15, wherein said server is further programmed to associate a predetermined time with the first position of the vehicle and at least one notice for a predetermined location.

20. A system in accordance with claim 15, wherein said server is further programmed to set the first time to a current time and the first position to a current position of the vehicle.

* * * * *